July 20, 1965          G. R. REED          3,195,350

TRANSMISSION TESTING MACHINE

Filed July 5, 1961          3 Sheets-Sheet 1

July 20, 1965    G. R. REED    3,195,350
TRANSMISSION TESTING MACHINE
Filed July 5, 1961    3 Sheets-Sheet 3

__

3,195,350
TRANSMISSION TESTING MACHINE
George Raymond Reed, Lambertville, Mich., assignor to Dana Corporation, Toledo, Ohio, a corporation of Virginia
Filed July 5, 1961, Ser. No. 121,897
9 Claims. (Cl. 73—162)

This invention relates to testing equipment in general, and more specifically to a testing machine of the locked-in torque type.

Prior art locked-in torque type dynamic testing machines, for testing coupling devices, gears, transmission, and the like, require the desired locked-in torsional load for the testing system to be locked in when the device is in a static condition. The device is tested dynamically for the desired cycle period, and then must be stopped and brought to a static condition before the load can be removed, varied, or reversed. The means provided for locking in the loads are normally difficult and time consuming to operate. Also, because of this loading requirement, these devices do not allow a full program of testing wherein true operating conditions can be duplicated; for in true operation the torsional load imposed upon a mechanism does not remain constant, but is constantly varying and reversing as dictated by the operating conditions.

Therefore, it is an object of this invention to provide a dynamic testing machine wherein torsional loads may be introduced while the unit is in operation.

It is another object of this invention to provide a dynamic testing machine of the locked-in torque type wherein a torsional load may be imposed, varied or reversed while the unit is in operation.

It is yet another object of this invention to provide such a testing machine wherein the loads may be applied or reduced at variable rates while the unit is in operation.

It is a further object of this invention to provide such a testing machine which provides an easy and rapid method of applying a load.

It is a still further object of this invention to provide a locked-in torque type testing machine which is easy to manufacture, simple to operate, yet very durable and accurate.

Other and further objects and advantages of this invention will become apparent upon reading the following detailed description when taken in conjunction with the accompanying drawings wherein.

Figure 5:
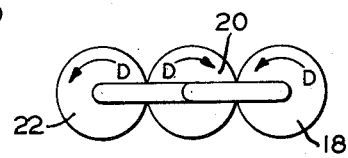
Figure 6:
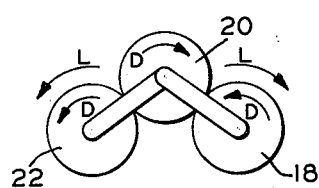
Figure 7:
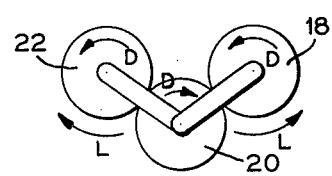

FIGS. 5, 6, and 7 are diagrammatic views showing the results of moving the loading gear. FIG. 5 shows the loading gear in its neutral or unloaded condition; FIG. 6 shows the loading gear displaced upwardly and FIG. 7 shows the loading gear displaced downwardly.

The present invention contemplates a loading mechanism for a locked-in torque testing device whereby the locked-in torque may be varied or reversed while dynamically testing to duplicate operating conditions. The loading device comprises a gear box having disposed therein three parallel shafts which in the unloaded condition are preferably co-planar. Each shaft has a gear mounted thereon for rotation therewith; the gears on the outer two shafts each being in mesh with the gear on the central or intermediate shaft. One of the outer shafts is rotatably mounted in said gear box while being fixedly positioned relative thereto. This shaft is considered the driving shaft and is furnished with a suitable source of rotative power. The output end of this shaft is coupled by universal means to a double right angle driving arrangement. The double right angle driving arrangement is further coupled by universal means to the other outer shaft in the gear box which shall be called the driven shaft. This other outer shaft or driven shaft is rotatably mounted relative to the gear box and also mounted for uni-planar movement relative to the driving shaft. The central shaft, herein referred to as the loading shaft, is also rotatably mounted within the gear box and is also movable relative thereto in a plane perpendicular to the plane defined by the outer shafts. Thus, it is apparent that torque which is imposed on the driving gear is transferred through a closed system defined by the gears, the universal couplings and the double right angle drive. It is also apparent that the driving and driven gears will be rotated in the same direction in response to rotational input load.

Novel means have been provided for locking a torsional load into this closed system. This means includes the central or loading gear, which by its movement in a plane perpendicular to the plane determined by the drive and driven gears forces these gears to rotate in opposite directions. This opposite movement of the drive and driven gears induces a torque load into the system. The movement of the loading shaft is accomplished by power means attached to it, which power means can move the shaft even when the unit is operating.

Means are also provided to maintain the center distance between the drive and driven shafts and the loading shaft constant so that the gears remain in mesh and so that once the torsional load has been locked into the system it will remain constant until the loading gear is once more moved relative to the drive and driven gear.

Figure 1:
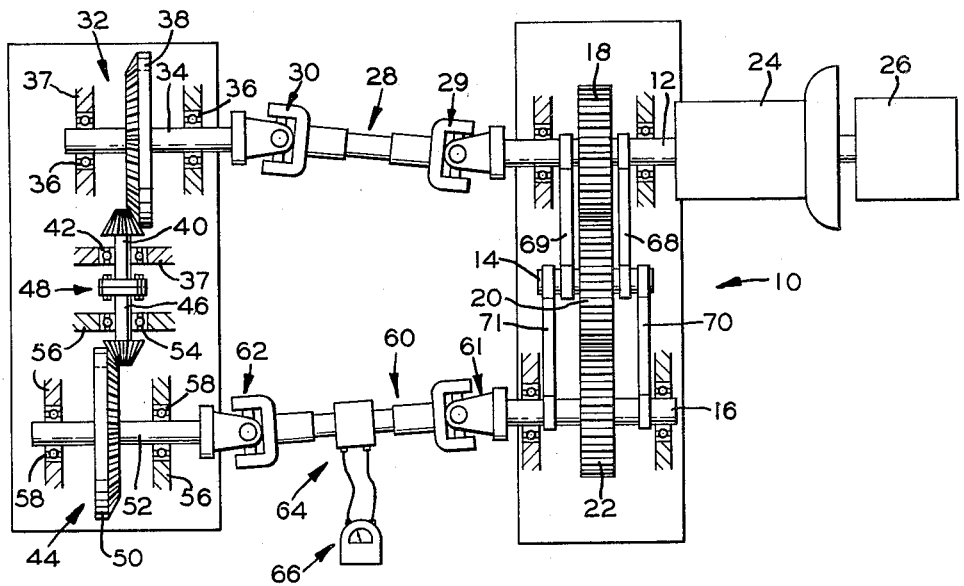
FIG. 1 is a diagrammatic plan view of a testing machine embodying this invention.

Referring now to the drawings and more particularly to FIG. 1, wherein a testing machine embodying this invention is showing diagrammatically, the loading mechanism, the gear box of which is shown generally at 10, comprises a driving shaft 12, a loading shaft 14 and a driven shaft 16. Mounted on each shaft for rotation therewith is a gear; more specifically, on driving shaft 12 is driving gear 18, on loading shaft 14 is loading gear 20, and on driven shaft 16 is driven gear 22. The driving shaft 12 is driven by a suitable multiple speed transmission 24 which in turn is driven by a suitable variable speed power source 26.

Any well known coupling means 28, having universal connections 29 and 30 provided therein, connects the driving shaft 12 with the first right angle drive unit 32. The right angle drive 32 consists of an input shaft 34 mounted by bearings 36 in a gear case shown fragmentarily at 37. Mounted on the shaft 34 for rotation therewith is a ring gear 38 which is in mesh with a pinion gear 40. The pinion gear 40 is also mounted for rotation in the gear case 37 by a bearing 42.

A second right angle drive unit 44 is drivingly connected to the first right angle drive unit 32. More particularly, a pinion 46 is coupled to the pinion 40 by a suitable coupling means shown generally at 48. The pinion 46 is in mesh with a ring gear 50 which is mounted on shaft 52 for rotation therewith. The pinion 46 is mounted for rotation by a bearing 54 in the second right angle drive gear case shown fragmentarily at 56, and the shaft 52 is supported by bearings 58 in the case 56. The shaft 52 is coupled to the driven shaft 16 by a second coupling means shown generally at 60 which includes universal joint connections 61 and 62. Incorporated in the coupling 60 is a torsion meter 64 of any well known type which is connected to a suitable strain indicating meter 66. The combination of the torsion meter and the indicating meter enables the operator to easily determine the amount of torsional load present in the system. The system as arranged can be used to test either the right angle drive units or the coupling means.

Connecting the driving shaft 12 and the loading shaft 14 are a pair of connecting rods 68 and 69 one on each axial side of the gears 18 and 20. Connecting the driven shaft 16 and the loading shaft 14 are a second pair of connecting rods 70 and 71 one on either side of the gears 20 and 22. These connecting rods assure that the center distance between the shafts 12 and 14 and between the shafts 14 and 16 remain constant thereby assuring that the gears 18 and 20 and the gears 20 and 22 are properly intermeshed in driving relationship.

Figure 3:
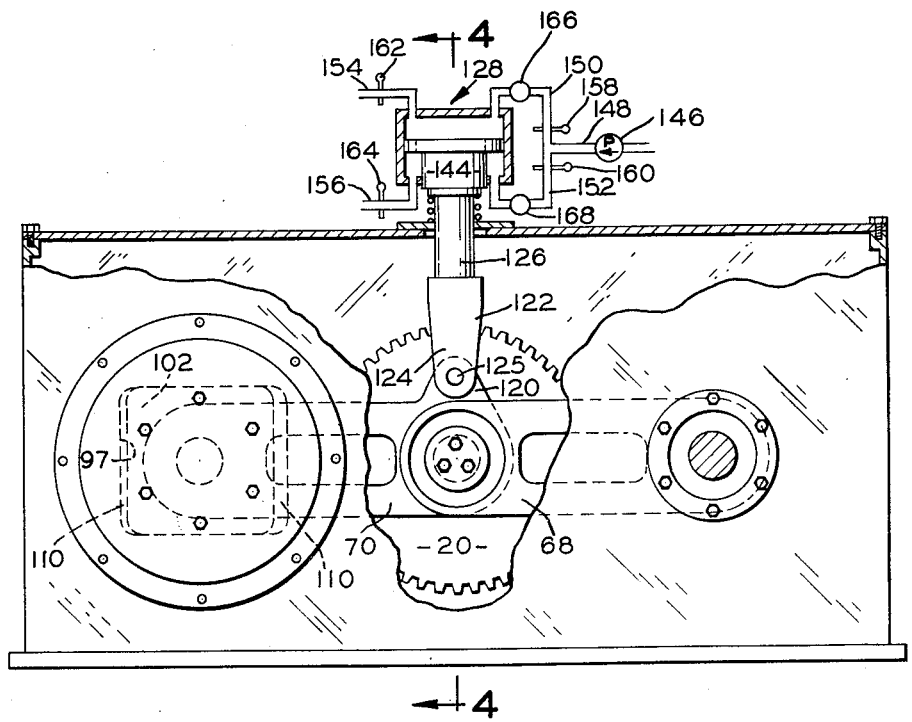
FIG. 3 is a front elevational view, partially cut-away, of the gear box containing the loading gears and a diagrammatic showing of the loading means.
Figure 2:
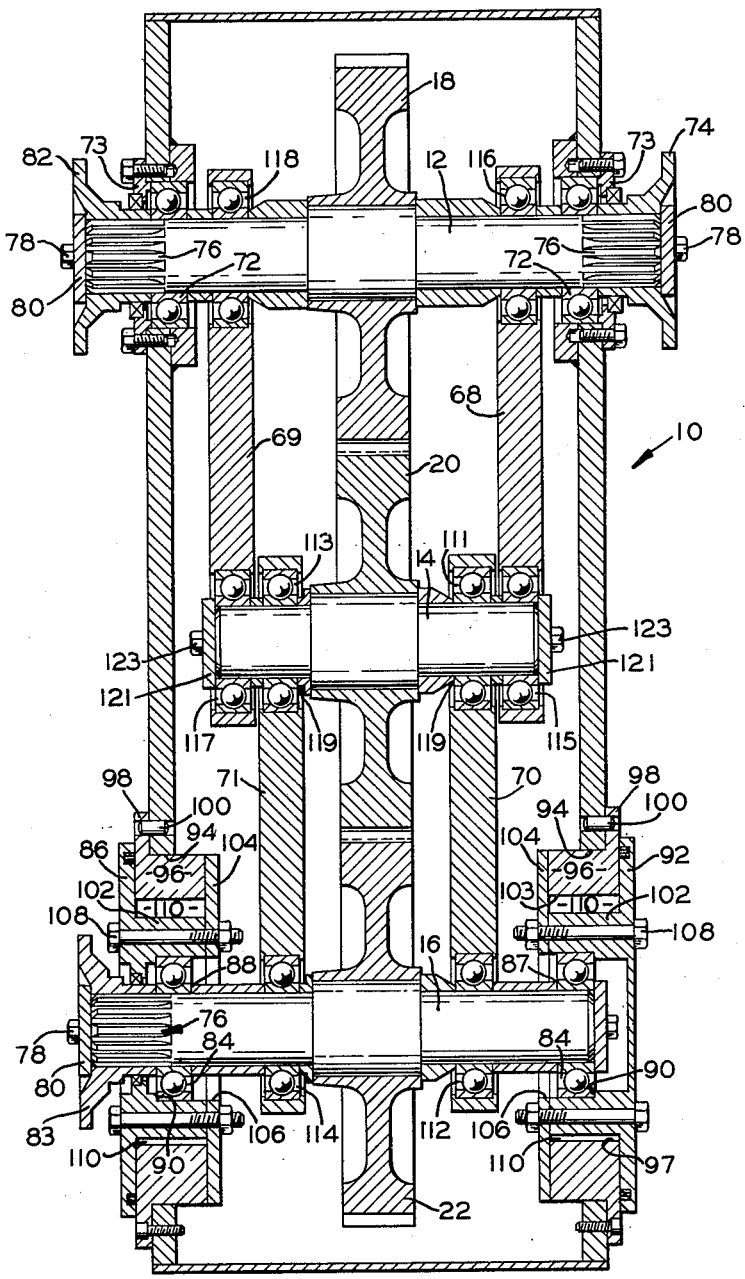
FIG. 2 is a plan view in section of the gear box containing the loading gears.
Figure 4:
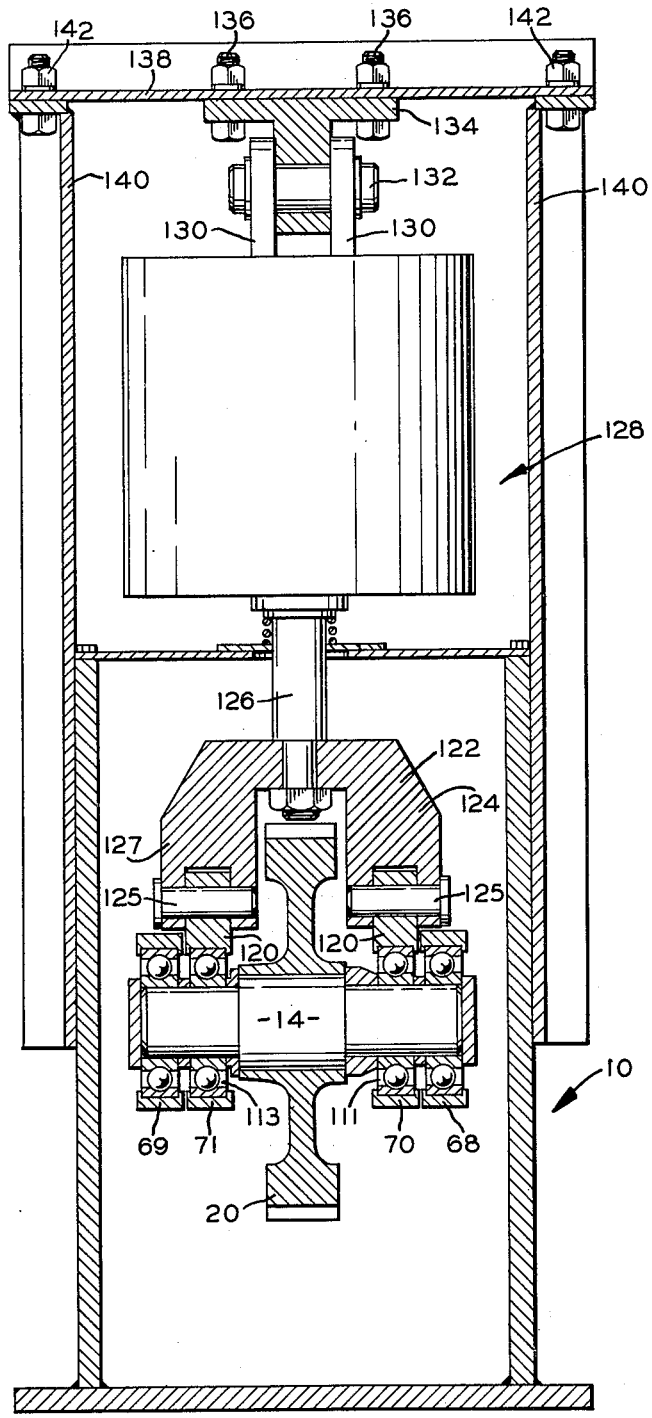
FIG. 4 is an end view in detail of the loading gear and shaft and the means for moving said shaft taken along the lines 4—4 in FIG. 3.

Referring now to FIGS. 2, 3 and 4 where the loading gear box or case 10 is shown in greater detail, it is apparent that the driving shaft 12 is rotatably mounted in the gear box 10 by means of bearings 72 which are interposed between the shaft 12 and the gear box 10, and which are fixedly positioned in the box 10 by bolt-on bearing caps 73. As viewed in the drawing the right end of the shaft 12 has a flange 74 mounted thereon, as by a splined engagement shown generally at 76, for rotation therewith. The flange 74 is fixedly secured to the shaft 12 by means of a bolt 78 and a suitable cooperating washer 80. The left end of the shaft 12 has a flange 82 attached thereon in a manner similar to that of flange 74. The flange 74 serves as a coupling point for the input power from the transmission 24 and the flange 82 serves as the coupling point for coupling means 28.

The driven shaft 16 is rotatably mounted in bearings 84, one provided at each end thereof. The shaft 16 has a pair of shoulders 87 and 88 provided thereon against which the inward edge of each bearing 84 abuts to limit the inward movement thereof. The bearings 84 are each further received in a bearing cap or cover 86. The bearing covers 86 are each provided with a shoulder 90 which abuttingly engages the outer edge of the bearings 84 and prevents the outward movement thereof. The covers 86 are movingly positioned in the gear case 10. More specifically, the case 10 is provided with a pair of algined openings 94 into which a portion of the covers 86 extends.

A spacing bushing 96 is positioned in each opening 94. Each bushing 96 has a flange 98 thereon which extends beyond the opening 94 and engages the case 10. The bushings are provided with a rectangular opening 97 for receiving the bearing cap 86. A plurality of pins 100 or other suitable connecting means fixedly connect the flange 98 of the bushing 96 with the case 10. A flange 92 provided on each bearing cap 86 extends externally of the case 10 and overlaps the bushing 96 and is in sliding engagement therewith. The bearing cap 86 extends into the case and has a rectangular boss 102 provided thereon, the shape of which is clearly shown in FIG. 3. The boss is of approximately the same thickness as the bushing 96. An annular plate 104, having an opening 106 of sufficient size to accommodate the driven shaft 16, is fixedly attached to the boss 102 and slidingly engages the inner side of the bushing 96. A fixed attachment between the plate 104 and the boss 102 is provided by a plurality of bolts 108 which extend through aligned openings provided therein. Since the flange 92 and the plate 104 of the bearing cover 86 are merely in sliding engagement with the bushing 96, relative motion may take place therebetween. The opening in bushing 96 being rectangular and the boss 102 also being rectangular, but of a smaller dimension in a horizontal direction as clearly shown in FIG. 3, provide a clearance 110 on both sides of the boss. In the vertical direction there is no space between the bushing 96 and the boss 102 and these two members are in sliding engagement in this location. Therefore, it is apparent that the cover 86 may only move horizontally relative to the bushing 96 and the case 10 while being held from vertical movement and thus the shaft 16 may move relative to the shaft 12 in a uni-planar relationship. A flange 83 is mounted on the left end of shaft 16 by a spline engagement shown generally at 76 and fixedly positioned thereon by a bolt 78 and washer 80. This flange 83 provides a means for mounting the coupling means 60 to shaft 16.

The loading shaft 14 is suspended within the case 10 by means of the connecting rods 68, 69, 70 and 71. More particularly, the connecting rods 70 and 71 are pivotally mounted on the shaft 16 and having interposed therebetween bearings 112 and 114 respectively, so that the shaft 16 may rotate relative to the connecting rods and further so that the connecting rods may pivot relative to the shaft 16. The shaft 14 is similarly mounted for rotation in the other end of rods 70 and 71 by means of bearings 111 and 113 respectively. Furthermore, the loading shaft 14 is suspended relative to the driving shaft 12 by means of connecting rods 68 and 69. The rods 68 and 69 are pivotally mounted on the shaft 12 and have bearings 116 and 118 respectively interposed therebetween so that the shaft 12 may rotate relative to the rods 68 and 69 and further so that the rods may pivot relative to the shaft. The shaft 14 is similarly mounted for rotation in the other ends of rods 68 and 69 by means of bearings 115 and 117 respectively. The bearings 111, 113, 115 and 117 are pressed on the shaft 14 and abut against shoulders 119 thereon and washers 121, held on the ends of shaft 14 by bolts 123, to securely position the bearings.

From the foregoing it is apparent that the loading shaft 14 and the gear 20 carried thereby may move perpendicularly relative to the plane defined by the shafts 12 and 16; that the shaft 12 is fixedly positioned, except for rotative movement, relative to the case 10; and that the shaft 16 may move relative to the case 10 and the other two shafts 12 and 14 while remaining within the plane originally defined by the shafts 12 and 16. Since the shafts are interconnected by the connecting rods, when the shaft 14 moves perpendicularly to the plane defined by the drive and driven shafts 12 and 16, the shaft 16 will move closer to the shaft 12, and the distance between the shafts 12 and 14 and between the shafts 14 and 16 will remain constant, thus assuring that the gears 18 and 20 and 20 and 22 will remain in a proper meshing relationship and that driving torque from the gear 18 can be transferred by means of the intermediate or loading gear 20 to the driven gear 22.

Referring now more particularly to FIGS. 3 and 4, means is provided for moving the loading shaft 14 in a direction perpendicular to the plane of the outer two shafts 12 and 16. More particularly, the connecting rods 70 and 71 each have a boss 120 provided thereon adjacent the location of bearings 111 and 113. A yoke 122 with lugs 127 and 124 provided thereon, which lugs each surround one of the bosses 120, is pivotally connected to the bosses by means of pivot pins 125. Extending upwardly from the yoke 122 is the power shaft 126 which extends into a two-way power cylinder shown generally at 128. As seen in FIG. 4 the power cylinder 128 is provided with a pair of upwardly extending projections 130 which are pivotally connected by means of a pivot pin 132 to a T-shaped mounting member 134. The mounting member 134 is fixedly attached as by bolts 136 to a cross brace 138. The cross brace 138 is fixedly attached to the upright braces 140 as by bolts 142. The upright braces 140 are in turn fixedly attached one on each side of the case 10. These braces firmly support and position the power cylinder 128 relative to case 10 and the gears contained therein.

Referring now to FIG. 3, where the power cylinder 128 is shown diagrammatically so that its operation may be clearly explained, a piston 144 is disposed within the power cylinder and is securedly connected to the shaft 126. A source of fluid pressure represented by the pump 146, is provided to supply fluid to the power cylinder. Either liquid or gas fluid may be used; however, in this preferred embodiment it has been found that gas pressure gives more satisfactory results. A manifold line 148 extends from the pump and branches into two inlet lines 150 and 152; inlet line 150 extends into the upper portion of the power cylinder 128 and inlet line 152 extends into the lower portion of power cylinder 128. A pair of exhaust lines 154 and 156 are provided to exhaust the upper and lower portions of the power cylinder 128. The lines 150, 152, 154 and 156 are supplied with shut-off valves 158, 160, 162 and 164 respectively.

In operation with both exhaust valves open and both inlet valves closed, the power cylinder will take a neutral position as the result of the release of torsional load within the closed system of the testing machine. If it is desired to move the loading shaft 14 upwardly, the inlet valve 160 is opened and the outlet valve 164 is closed, and pressure from the pump 146 is supplied through line 148, 152 and into the lower portion of the power cylinder 128. Pressure regulators 166 and 168 are supplied in inlet lines 150 and 152, and the desired pressure may be maintained within the power cylinder to give the desired load on the strain indicating meter 66. The pressure is regulated at a value that gives the desired torsional load which is locked into the system until the pressure is varied or removed. If it is desired to move the loading shaft 14 downwardly, the valves 152 and 154 are closed, and valves 156 and 158 are opened, so that fluid passes from the pump through line 148, line 150 and into the upper portion of the power cylinder 128, which results in downward movement of the piston 144, shaft 126, yoke 122, and shaft 14.

By closing either of the inlet valves 158 or 160, depending on which part of the pressure cylinder is charged, the charge within that portion of the cylinder will remain constant. By opening the proper outlet valve 162 or 164, the pressure within the power cylinder may be "bled-off" and the load slowly reduced. By proper manipulation of the various control means the load may be varied, reversed, or reduced slowly to duplicate the operating conditions on the element being tested.

FIGS. 5, 6 and 7 diagrammatically show the inducement of loads into the drive and driven gears 18 and 22 by movement of the loading gear 20; while the gears are shown as driving in the direction of the arrows "D" their direction may be reversed. In FIG. 5 the gears are all co-planar and no load is present in the system. In FIG. 6 the loading gear 20 has been moved upwardly thereby loadingly rotating the gears 22 and 18 relative to the gear 20 in the directions of the arrows "L." It is apparent that the relative loading rotation of gears 18 and 22 is in opposite directions, and since normally these two gears in operation are drivingly rotated in the same direction, the opposite loading rotation induces a torsional load in the system. FIG. 7 shows the result of moving the loading gear 20 downwardly thereby loadingly rotating the gears 18 and 22 in the direction of the arrows "L" which is in the opposite direction of the loading rotation shown by the arrows "L" in FIG. 6 thereby demonstrating that the torsional load can be induced into the system in a reverse direction.

From the foregoing it is apparent that a testing machine has been described which will allow torsional loads to be introduced into the system while the unit is in driving operation, that will allow a locked-in torque type load to be imposed, varied or reversed while the unit is in operation, that will allow such loads to be applied or reduced at variable rates, which provides an easy and rapid method of locking in a load, and which is easy to manufacture, simple to operate, yet very durable and accurate.

The preferred embodiment of this invention has been shown and described, but changes and modifications can be made, and it is understood that this description is illustrative only and not for the purpose of rendering this invention limited to the details illustrated or described except insofar as they have been limited by the terms of the following claims.

What is claimed is:

1. In a testing machine of the locked-in torque type defining a closed system, a loading device in the system comprising in combination, an intermediate rotatable means having a central axis of rotation, a first and a second outer rotatable means each having a central axis of rotation and each drivingly connected to said intermediate rotatable means, means maintaining the axes of said outer rotatable means in a single plane, said first and second outer rotatable means being adapted to rotate about their axes in the same direction when operatively transmitting torque in the closed system, means for moving said intermediate rotatable means toward and away from the plane defined by said outer rotatable means during rotation thereof whereby said outer rotatable means will be rotated oppositely relative to each other thereby causing a change in the torsional load in the system.

2. A testing machine of the locked-in torque type defining a closed system comprising in combination, a first and a second outer shaft, means maintaining said shafts in a single plane, coupling means, including the device to be tested, joining said outer shafts for rotation in the same direction to transmit torque through the system, an intermediate loading shaft, gear means on said shafts drivingly connecting said intermediate shaft to each of said outer shafts for rotation in a direction opposite thereto to transmit torque through the system, said intermediate loading shaft being movable toward and away from the plane defined by said outer shafts, whereby said outer shafts will be rotated oppositely relative to each other thereby causing a change in the torsional load locked into the system.

3. A testing machine of the locked-in torque type defining a closed system comprising in combination, a first and a second outer shaft, means maintaining said shafts in a single plane, coupling means, including the device to be tested, joining said outer shafts for rotation in the same direction, an intermediate loading shaft, gear means on said shafts drivingly connecting said intermediate shaft to each of said outer shafts for rotation in a direction opposite thereto, a plurality of rods pivotally connecting said outer shafts to said intermediate loading shaft for maintaining said gear means in driving relationship upon relative movement of said shafts, and means for moving said intermediate shaft normal to the plane defined by said outer shafts whereby said outer shafts will be rotated oppositely relative to each other thereby causing a change in the torsional load locked into the system.

4. A testing machine of the locked-in torque type defining a closed system comprising in combination, a first and a second outer shaft each having gear means rotatable therewith, means maintaining said shafts in a single plane, coupling means, including the device to be tested, joining said outer shafts for rotation in the same direction, an intermediate loading shaft co-planar with said outer shafts when the testing machine is not loaded and having gear means rotatable therewith in mesh with the gear means of said outer shafts, said intermediate shaft being rotated oppositely relative to said outer shafts when said system is operating, means for maintaining a constant distance between the intermediate shaft and each of the outer shafts, and means for moving said intermediate shaft from its co-planar relationship with the outer shafts while said outer shafts are rotating in the same direction whereby said outer shafts will be rotated oppositely relative to each other inducing a torsional load to the system.

5. A testing machine of the locked-in torque type defining a closed system comprising in combination, a gear box, a driving shaft rotatably mounted in said gear box and fixedly positioned relative thereto, said driving shaft being adapted to be driven by a source of rotative power, a driven shaft rotatably mounted in said gear box and movably positioned therein in uni-planar relationship relative to said driving shaft, a double right angle drive unit, a first coupling means joining said driving shaft to the input of said double right angle drive unit, a second coupling means joining said driven shaft to the output of said double right angle drive unit whereby said driving and driven shafts rotate in the same direction, a loading shaft rotatably and movably disposed in said gear case intermediate said driving and driven shafts, said shafts being parallel and in uni-planar relationship when the system is not loaded, gear means mounted on each of said shafts for rotation therewith, with the gear means on the loading shaft being in mesh with said gear means on said driving and driven shaft thereby forming a closed system, means maintaining said loading shaft at a constant distance relative to said driving shaft and to said driven shaft maintaining said gear means in driving relationship, controllable power means for moving said loading shaft from its uni-planar position relative to said driving and driven shafts causing said driving and driven shafts to rotate relative to each other whereby the torsional load in the closed system is changed, and means incorporated in said system for measuring the amount of torsional load therein.

6. A loading device for a locked-in torque testing machine wherein a mechanism for transmitting rotary motion and having an input and an output means is to be tested and wherein the input and output means are connected by driving means to said loading device to form a closed system and including power means operative to supply rotative drive to the closed system comprising in combination, a first and a second outer rotatable means each having a central axis and each being rotated about its axis in the same direction when said system is being rotatively driven, one of said outer rotatable means being drivingly connected to and rotatable with the input means of said mechanism, the other of said outer rotatable means being drivingly connected to and rotatable with the output means of said mechanism, an intermediate rotatable means having and being rotatable about a central axis, means drivingly connecting said intermediate rotatable means to each of said outer rotatable means for rotating oppositely relative thereto whereby said outer rotatable means rotatably drives said intermediate rotatable means in a direction opposite to the direction of rotation of said outer rotatable means when said system is being rotatively driven, and means for moving the central axis of one of said rotatable means toward and away from the plane defined by the axes of said outer rotatable means and rotating said outer rotatable means oppositely relative to each other whereby the level of torsional load in the closed system is changed.

7. A loading device according to claim 6 wherein said rotatable means are shafts, said means drivingly connecting said shafts is a plurality of gears with one gear of said plurality of gears drivingly connected to each shaft, and wherein each of said outer shaft gears are meshed with said intermediate shaft gear.

8. A loading device according to claim 7 wherein means maintain the central axes of said outer gears in a single plane and wherein said loading means moves said intermediate gear relative to said outer gears so that the central axis thereof moves toward and away from the plane defined by the central axes of said outer gears to rotate said outer gears oppositely relative to each other.

9. A loading device according to claim 8 including means maintaining a constant distance between the axis of each of said outer gears and the axis of said inner gear.

References Cited by the Examiner
UNITED STATES PATENTS

| | | | |
|---|---|---|---|
| 2,157,903 | 5/39 | Lapsley | 73—162 X |
| 2,371,607 | 3/45 | Collins | 73—162 X |
| 2,712,756 | 7/55 | Greer et al. | 73—162 X |
| 2,981,103 | 4/61 | Livezey | 73—162 |

RICHARD C. QUEISSER, *Primary Examiner.*

ROBERT L. EVANS, JOSEPH P. STRIZAK, *Examiners.*